Nov. 26, 1963   E. F. PETERSON   3,112,016
MOUNTING BLOCKS FOR VIBRATORY MECHANISMS
Filed Dec. 5, 1958
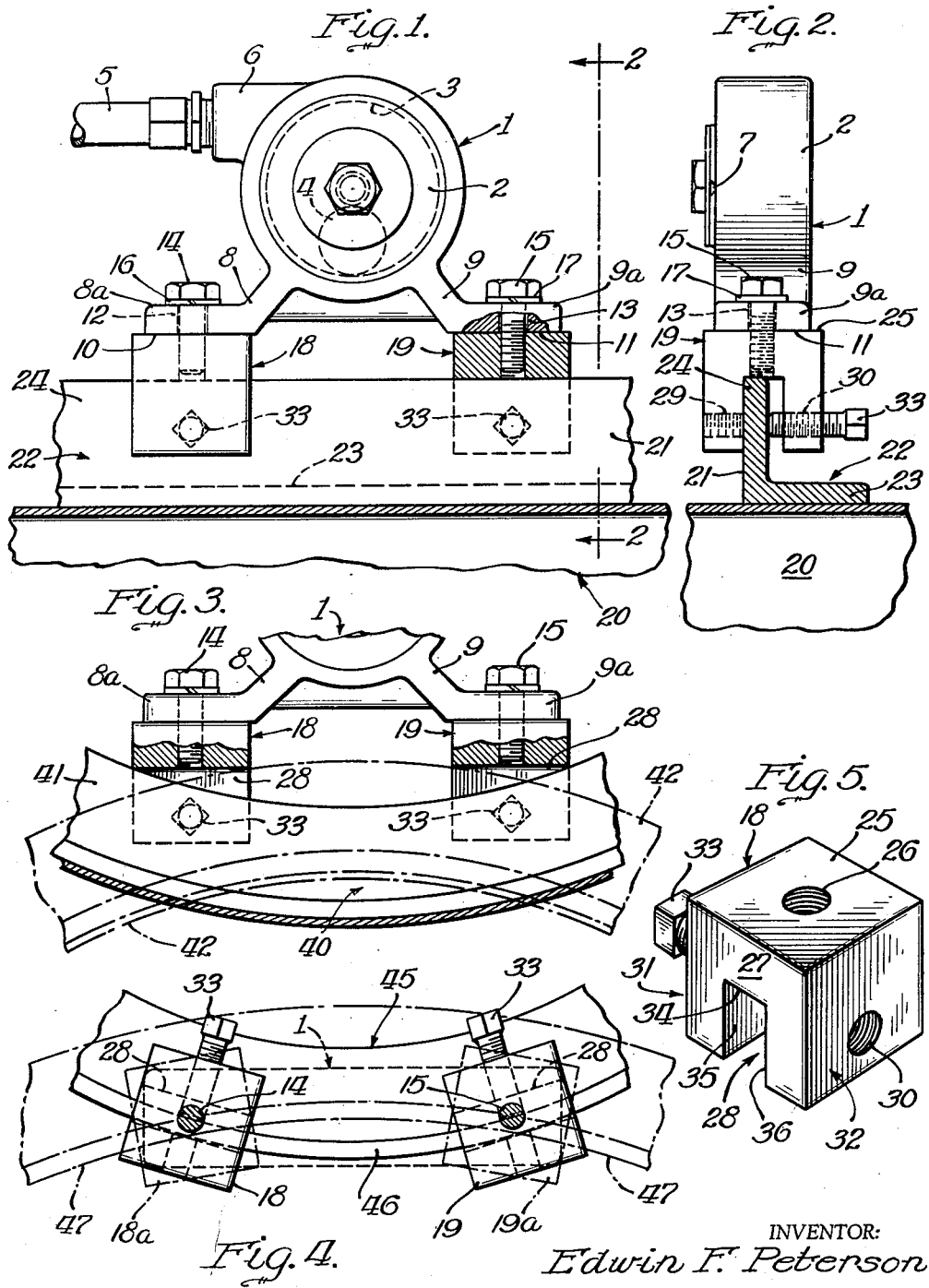
INVENTOR:
Edwin F. Peterson

United States Patent Office 3,112,016
Patented Nov. 26, 1963

3,112,016
MOUNTING BLOCKS FOR VIBRATORY
MECHANISMS
Edwin F. Peterson, P.O. Box 151, Neponset, Ill.
Filed Dec. 5, 1958, Ser. No. 778,373
15 Claims. (Cl. 189—36)

This invention relates to mounting means that provide the instrumentalities for rigidly securing a vibratory mechanism in place upon an object for vibration transmittal directly to such an object.

More specifically this invention is directed to a cooperative pair of mounting blocks that are releasably attached with spaced mounting portions or feet of a vibration inducing unit and which blocks provide a universally selectable choice of attachment arrangements for anchoring or securing the vibrational unit to an object or mechanism for direct vibration transmittal to that object or mechanism.

A suitable and conveniently effective manner of attaching vibratory mechanisms to various structural parts of the objects to be subjected to vibrational reactions has always presented problematical difficulties. As a matter of fact, most vibratory units are fixedly secured to an object by welding or by providing holes in a piece of equipment to receive fastening means for the securement of a unit into a fixed position on that equipment. The positions selected are not always found to be the most feasible or the best. Such locations may only be determined through actual practice. Even then there may be some question as to the best position of a vibrator if the equipment may, for example, be suddenly converted or otherwise made to handle different kinds of products or other substances.

It is an object of this invention to provide a mounting facility that will overcome the various difficulties noted and which will enable a broader and much more flexible use for the attachment of different kinds of vibratory devices.

Another object is to provide an attaching means that does not necessitate auxiliary means as a structural part of or the presence of holes or other openings in a piece of equipment that are provided for the purpose of securing a vibratory means thereto.

As another object, the invention contemplates the provision of mounting instrumentalities that will readily permit a wide freedom of choice of location in attaching a vibratory means to equipment. By the same token, these mounting instrumentalities are such as to allow quick and feasible change of a secured device from one position to another with very little effort and loss of time.

Another object of the mounting means of this invention is to provide a fast on and off assembly to attach, detach or to change the location of a vibratory device.

A still further object relates to the universal attachment choices that are made possible with the mounting blocks of this invention as the same are assembled and associated with spaced mounting pads or feet of a vibratory mechanism for securing the latter to a piece of equipment.

Other objects and advantages that are inherent in the mounting means of the present invention shall hereinafter appear in or become apparent from the following detailed description of a preferred form of the invention as illustrated on the accompanying drawing forming a part of this specification.

In the drawing:

FIG. 1 is a side elevational view of a typical assembly comprising a vibratory device and a piece of equipment embodying the mounting blocks of the present invention to secure the units, certain parts being broken away and shown in section to emphasize details of construction;

FIG. 2 is an end elevational view of the FIG. 1 mechanism with parts thereof shown in cross section and as viewed substantially along the plane of the line 2—2 in FIG. 1;

FIG. 3 is a fragmentary side elevational view comprising a repeat of FIG. 1, but further illustrating other applications that are possible in using the present mounting blocks for securement purposes;

FIG. 4 is a plan sectional view taken co-incident with the common upper or horizontal top faces or surfaces of the pair of mounting blocks and illustrating some further securing applications that are readily possible for attaching a vibratory device to an object; and FIG. 5 is a perspective view of one of the mounting blocks per se to better show the simplicity thereof and the salient structural details of these blocks.

The mounting blocks of this invention are identical and fully interchangeable. The are sturdy, simple and versatile. While there are at least two blocks used in cooperate fashion, they will be independently numbered for identification and explanation; while their respective corresponding structural parts will be identified by like reference characters.

In the drawing, the vibratory device 1 represents a conventional type providing a barrel housing 2 having a suitable raceway 3 and a free ball 4 that is propelled about the raceway 3 by means of fluid supplied through a hose 5 into a tangential hollow access boss 6 and which fluid is exhausted through openings such as 7 out of the central portion of the barrel housing 2. This described means sets up the unbalanced forces in the vibratory device 1.

Device 1 further includes spaced two point mounting means in the form of pads or legs 8 and 9 that are usually integrally formed as part of the housing 2.

The spaced legs 8 and 9 are provided with feet 8a and 9a having coplanar bottom faces 10 and 11 that establish reference surfaces or attachment areas which are employed for mounting purposes. The legs have substantially centrally located openings or bores 12 and 13 to provide access structures to receive suitable fastening means therethrough such as the bolts 14 and 15 which include shockproof washers such as 16 and 17.

Vibratory devices like 1 are widely used for agitating or vibrating objects carrying various kinds of materials that are being dispensed, conveyed or compacted. Such equipment is usually of sheet metal or steel shell construction that includes framework and brace members that are flanged in character such as channel irons, angle irons and similar structural elements of various kinds of material. Hoppers, bins, ducts, railway dump car bodies, chute conveyors and a great many other material handling structures are thus generally provided with suitable flanged members that have been found to possess ideal rigid properties and vibration transmittal characteristics to support and carry vibratory devices. In other cases the vibratory devices are employed for compacting materials as in mold structures or more particularly in connection with concrete forms during the pouring of concrete. Metal ironwork or other types of braces will provide flanges to which the devices may be attached for their intended functions.

While the attachment of such devices may be managed in various ways, the present invention provides a pair of mounting blocks 18 and 19 that are identical, reversible and interchangeable in their design and in the manner in which they are employed to quickly, efficiently and rigidly mount the vibratory device 1 upon a material handling object 20 having a structural framework 21 including an angle iron 22 providing angled legs or flanges 23 and 24.

The mounting blocks 18 and 19 are quite massive and cubical in shape. Each block comprises a flat top 25 having a vertically arranged threaded bore 26 located centrally of the block top and made to pass through the cross wall 27 located above a transverse block slot 28. Another pair of aligned threaded bores 29 and 30 are arranged at right angles to the opposite outer block faces 31 and 32, such bores being disposed toward the lower edges of faces 31 and 32 as best shown in FIGS. 2 and 5. A set screw 33 is provided for one of the threaded bores. Under certain conditions, two such set screws 33 may be employed, one in each of the threaded bores 29 and 30.

The block slot 28 comprises a depth control wall 34 that lies parallel to the block top 25 and two side walls 35 and 36 that are parallel to the opposite outer block faces 31 and 32 and also parallel to each other. The block per se therefore provides a comparatively heavy U-shaped device having three identically drilled and tapped holes 26, 29 and 30 positioned in a common transverse block plane intersecting slot 28. The top 25 provides a reference surface for either one of the legs of the vibratory device 1, while the slot 28 provides the orientation means that accommodates leg 24 of the angle iron 22 or any similar flange of any piece of structural material. And the set screw 33 forms the handy and quickly manipulated means to anchor the block upon the flange, the latter flange having one side thereof occupying an abutting face to face position against one of the slot walls 35 or 36 with the set screw 33 engaging the opposite or non-abutting side of the flange.

With the pair of blocks 18 and 19 secured to legs 8 and 9 of device 1 by means of the spaced bolts 14 and 15 as shown in FIG. 1 and with the set screws 33 each drawn up tightly against flange 24 of angle iron 22, the vibratory device 1 will be rigidly secured in releasable condition upon the framework 21 of a piece of equipment 20. While both blocks 18 and 19 are shown with the set screws 33 employed on the same side of flange 24, they may be both reversed in their block bores to place the set screws 33 on the near side as seen in FIG. 1. Or, either block may occupy a 180° bodily reversed position which will place the set screws 33 on opposite sides of flange 24.

An advantageous feature of the invention resides in the embodiment of single or individual securing bolts such as 14 and 15 that each occupy positions on vertically arranged axes spaced oppositely outwardly to either side of the vibratory device 1 and simultaneously being spaced widely apart from each other. Thus bolts 14 and 15 establish pivotal means intersecting the mounting areas provided at the opposing faces of the legs 8 and 9 in relation to the tops 25—25 of the mounting blocks 18 and 19 respectively.

Irregularities in the flange members of the frame members of the equipment are easily accommodated with the mounting block assemblies. By initially leaving the bolts 14 and 15 somewhat loose or slightly backed away while attaching the blocks to the flange 24 through their respective set secrews 33, the blocks will automatically be able to self-align in relation to the flanged structure. After the blocks are rigidly attached, then the bolts 14 and 15 can be drawn up tightly to complete the rigid attachment of the vibratory device 1 to the material handling object 20 by means of the mounting blocks 18 and 19.

Obviously, several sets of blocks can be used with certain types of equipment by orienting one pair in one given position and one or more pairs in other strategic locations to permit bodily switching of the vibratory device per se between several selected locations according to the most efficient operation of the vibratory action in relation to a given piece of equipment. Changing locations of device 1 would, therefore, only require the withdrawal of bolts 14 and 15. The positioning of the blocks would normally and initially be brought about by using the device itself as a templet means. In situations of this nature, wherein the blocks are left attached to a piece of equipment to provide means to accept a vibrator as and when required, it may be desirable to employ two set screws 33 as previously mentioned to securely anchor the blocks to the equipment.

FIGS. 3 and 4 are presented to show the wide latitude of application of the blocks 18 and 19 as portrayed by angle structures having different curvatures. The exact showings are only by way of example, it being understood that other curvatures may be equally well accommodated by the blocks.

In FIG. 3 the angle iron 40 is curved concavely upwardly with the blocks 18 and 19 secured to a flange 41. The same angle iron may be curved concavely downwardly as shown in dot and dash lines 42.

In FIG. 4 an angle iron 45 is shown as being curved in one direction in a horizontal plane with blocks 18 and 19 secured to a flange 46 thereof with bolts 14 and 15 providing pivotal means for the blocks in this particular situation. The angle iron may also be horizontally curved in the opposite direction as shown in dot and dash lines at 47 with the blocks then assuming the positions 18a and 19a.

While FIGS. 3 and 4 are limited to structural flanges curving or arching in single planes respectively, compound curvatures of such equipment flanges arching in both planes will be equally accommodated by the blocks 18 or 19 through their respective slot means and by reason of their swivel action upon their securing bolts that connect the blocks and the vibratory means.

In most instances, the shifting of a vibratory device 1 between selected locations will include the loosening of the set screws 33 and the bodily displacement of the device 1 with its attached mounting blocks 18 and 19 as an assembled structure. Bolts 14 and 15 need not be disturbed unless a new alignment of the blocks with respect to a flanged member is needed at the new location.

The spotting of the threaded bores 29 and 30 in the central and lower regions of the block faces 31 and 32 provides considerable latitude in accommodating variously curved flanged pieces as can readily be observed from FIG. 3. FIGS. 3 and 4 only attempt to illustrate some of the sharper curved pieces and all kinds of angles having larger sweeping curves may readily be accommodated well within the confines of the slots 28 in blocks 18 and 19.

The description has been chiefly directed to the preferred embodiment of the invention that is specifically illustrated in the drawing. While certain changes in the respective elements and in the combinations thereof are contemplated without departure from the fundamental concept of the mounting blocks of this invention, such modifications shall, however, be governed by the breadth and scope of the language that hereinafter appears in the claimed subject matter that is directed to the present invention.

What I claim is:

1. In a securing apparatus to directly mount a vibratory device in fixedly secured immovable relation with respect to and upon a piece of structural equipment comprising, in combination, spaced attachment elements on said device, an outwardly projecting flange member on said structural equipment, and mounting blocks interposed between said spaced attachment elements of said device and corresponding spaced locations on said flange member of said structural equipment, said blocks each including securing means to rigidly connect each block with one of said elements and with an adjacent portion of said single flanged member respectively whereby said blocks fully transmit the vibratory motion of said device to said structural equipment.

2. In a securing apparatus to mount a vibratory device in a fixed relation upon a given piece of equipment comprising, in combination, spaced attachment elements on said device, a protruding flange member on said equipment, and mounting units to connect said attachment elements with said flange member comprising blocks each having a slot to straddle said flange member at spaced locations thereon, and having fastening means to fixedly join said elements with each block, said blocks each including separate securing means to rigidly attach the blocks to said flange member for counteracting any relative movement between said blocks and the flanged member on said equipment.

3. In a securing apparatus of the character set forth in claim 2 wherein said fastening means are bolt structures positioned for operation upon parallel axes to permit independent pivotal rotative adjustment of said blocks about such axes prior to final fixed securement of said bolt structures to allow orientation and alignment of said slotted block in operative securable relation to said flange member.

4. In a securing apparatus of the character set forth in claim 2 wherein said block securing means each comprise set screw means connected for operation with said blocks along axes angularly arranged with respect to said block slots and in relation to said flange member, with said set screw means of each block being adapted to penetrate the block slot.

5. In a securing apparatus to mount a vibratory device upon a given piece of equipment comprising, in combination, spaced attachment elements on said device, a protruding flange member on said equipment, and mounting units to connect said attachment elements with said flange member comprising blocks each having a slot to loosely straddle said flange member at spaced locations thereon, and having fastening means to fixedly join said elements with each block, said blocks each including separate securing means to rigidly attach the blocks to said flange member, said fastening means comprising bolt structures positioned for operation upon parallel axes to permit independent pivotal rotation of said blocks about these axes prior to final fixed securement of said bolt structures to allow orientation and alignment of said slotted blocks in operative securable relation to said flange member, and said block securing means each comprise set screw means mounted for operation upon said connected block along an axis disposed angularly in relation to said flange member and with respect to the block slot, said set screw means of each block being adapted to traverse the adjacent block slot thereof to engage the loosely confined flange member of said piece of equipment.

6. In a securing apparatus of the character set forth in claim 5, wherein the bolt structure axes are located at right angles with respect to the axes of said set screw means of the blocks.

7. Attaching mechanism to bodily secure a device upon a piece of supporting equipment comprising, in combination, a pair of spaced feet on said device, an outstanding flange providing an integral part of said piece of equipment, and mounting blocks for each of said spaced feet of said device to rigidly connect the feet with the equipment flange, each of said blocks comprising an orientation top and side legs flanking a flange receiving slot running through said block from end to end, said block top and its corresponding foot of the device having bores formed therethrough to accommodate and to include a fastening member therethrough to rigidly secure said foot and block together, and each of said blocks having at least one lateral bore formed through one of said side legs opening into the block slot and having set screw means for said one bore to enter the slot and to engage a portion of the flange section disposed within said block slot.

8. In an attaching mechanism as in claim 7 wherein said feet are provided with coplanar bottom surfaces, and said block orientation tops provide coacting flat areas for surface contact with said bottom surfaces of said feet, and wherein said fastening members and their bores in the feet and blocks are each respectively located upon axes that vertically intersect the flat abutting surface areas of said feet bottoms and said block tops.

9. In an attaching mechanism as in claim 7 wherein the slots in each of said blocks provide spaced vertical walls, the fastening members are located on vertical axes intersecting the block slots, and said set screw means are each disposed on axes arranged at right angles with respect to said slot walls and in locations to penetrate the slot area.

10. In an attaching mechanism as in claim 7 wherein said flange is projected outwardly in upstanding relation to said piece of equipment in a direction to edgewise support said device thereon and wherein the feet of said device terminate in planes disposed at right angles with respect to said upstanding flange, and said blocks each provide the top surfaces thereof at right angles to the flange with the respective block slots disposed for orientation in the plane of the adjacent upstanding flange.

11. In a securing apparatus to rigidly attach a vibratory device upon a wall of a piece of structural equipment comprising, in combination, attachment elements rigidly connected with said device, a flange element forming a rigid part of said wall and projecting outwardly therefrom, and mounting units adapted for rigidly securing said attachment elements to said projecting flange element each comprising a block providing a smooth flat surface for abutting contact with a surface portion of an attachment element, said block having a slot formed therein to loosely accept the flange element therein, the general plane of said slot being angularly positioned with respect to the smooth flat surface of the block, and fastening members connecting each of said attachment elements with one of said blocks along upright axes arranged in the general plane of the projecting flange element to permit swiveling of each block relatively to the attachment elements prior to rigidly securing said respective elements together whereby to orient the block slots relative to the flange element, said blocks being provided with fastening means to secure same rigidly to said projecting flange element.

12. In a securing apparatus as in claim 11 wherein said blocks are each cubical in shape with said block slot bisecting the block and with said fastening members each located on axes positioned in the plane of the block slots respectively.

13. In a securing apparatus as in claim 11 wherein said projecting flange element is curved in the general plane of the slots of the mounting units and wherein said fastening means are located adjacent the flange element receiving mouth portions of the blocks to insure securing contact with the curved flange element.

14. In the combination of elements set forth and defined in claim 11 wherein a plurality of flanged elements provide rigid portions of said wall of the piece of equipment, such flanged elements all projecting outwardly from said wall, and wherein said mounting units comprise means to rigidly secure said device to at least one of said flanged elements to transfer the vibratory forces from said device directly to the wall through said one flanged element.

15. A mounting unit to secure a vibratory assembly to a projecting element of a piece of equipment being subjected to the vibratory action of said assembly comprising an independent block having a flat top thereon adapted for coincident surface contact with a flat surface area on said assembly, a single fastening member securely joining said block to said assembly along an axis arranged normal to said block top and the flat surface area of said assembly to permit relative rotary adjustment between said block and assembly prior to drawing up said fastening member, said block including a cavity portion in its lower surface extending thereacross to accept said projecting element of the piece of equipment therein to orient said block with said element, and a second single fastening member intersecting said block to project into said block cavity portion to engage the projecting element of the piece of equipment to fixedly join the latter to said block within said cavity portion thereof, said block providing an inner surface in its cavity to seat directly upon said projecting element in stabilizing contact therewith when both fastening members are fully drawn up and secured to join the connected parts together.

References Cited in the file of this patent
UNITED STATES PATENTS

| | | |
|---|---|---|
| 1,982,254 | Juengling | Nov. 27, 1934 |
| 2,372,163 | Whiteman | Mar. 20, 1945 |
| 2,737,094 | Jackson | Mar. 6, 1956 |
| 2,813,466 | Torgerson | Nov. 19, 1957 |
| 2,914,829 | Willemain | Dec. 1, 1959 |